US006753861B2

(12) United States Patent
Thrasher et al.

(10) Patent No.: US 6,753,861 B2
(45) Date of Patent: Jun. 22, 2004

(54) ACTIVE REGION DETERMINATION FOR LINE GENERATION IN REGIONALIZED RASTERIZER DISPLAYS

(75) Inventors: Thomas L Thrasher, Ft. Collins, CO (US); Ronald D. Larson, Ft. Collins, CO (US)

(73) Assignee: Hewlett-Packard Development Company, L.P.

( * ) Notice: Subject to any disclaimer, the term of this patent is extended or adjusted under 35 U.S.C. 154(b) by 295 days.

(21) Appl. No.: 09/982,352

(22) Filed: Oct. 18, 2001

(65) Prior Publication Data

US 2003/0076324 A1 Apr. 24, 2003

(51) Int. Cl.$^7$ .......................... G06T 11/20; G09G 5/00
(52) U.S. Cl. ...................................... 345/443; 345/619
(58) Field of Search ................................. 345/441–443, 345/619

(56) References Cited

PUBLICATIONS

Segal et al, The OpenGL Graphics System: A Specification (Version 1.3), Aug. 14, 2001, Chapter 3, pp. 60 and 67.*

* cited by examiner

*Primary Examiner*—Matthew C. Bella
*Assistant Examiner*—A Blackman

(57) ABSTRACT

In one embodiment, selecting a screen region on a screen of a monitor of a computer graphics display system to activate in rendering a straight line segment. Steps of aligning a rectangular grid to screen region boundaries, wherein the screen includes a screen space divided into at least one screen region, locating a first and second endpoints of the straight line segment on the screen space, defining a rectangular bounding box in the screen space having vertices at the first and second endpoints, identifying each screen region that at least partially overlaps the bounding box, and selecting each identified screen region through which the straight line segment passes to activate for rendering the straight line segment on the screen are disclosed.

2 Claims, 17 Drawing Sheets

ACTIVE REGION DETERMINATION FOR LINE GENERATION IN REGIONALIZED RASTERIZER DISPLAYS

FIELD OF THE INVENTION

The present invention relates generally to computer graphics displays, and particularly to the display of straight line segments on computer graphics displays.

BACKGROUND OF THE INVENTION

Computer graphics systems are commonly used to display graphical representations of two-dimensional or three-dimensional objects on a two-dimensional display screen. The display screen is typically a cathode ray tube (CRT) device and is divided into arrays of elements referred to as pixels which can be stimulated to emit a range of visual light. The stimulation of the pixels is performed sequentially in some regular order and is repeated typically 50 to 80 times a second in order to maintain a screen image whose intensity does not noticeably change with time.

Typical CRT devices for use with graphics workstations are "raster scan" display devices. Modem raster scan display devices generate images comprising a multiplicity of parallel, non-overlapping bands of pixels comprising sets of parallel lines.

In typical computer graphics systems, an object to be represented on the display screen is broken down into a plurality of graphics primitives. Primitives are the basic components of a graphics picture and may include points, lines, vectors, and polygons, such as triangles. Typically, a hardware/software scheme is implemented to render, or draw, on the two-dimensional display screen, the graphics primitives that represent a particular view of one or more objects being represented on the screen.

As display systems have increased in complexity to meet an ever-increasing demand for a larger display area and a greater fidelity in the representation of objects on the display screen, the load on the hardware and software required to process the image has also increased. An increase in object representation fidelity has been accomplished, in part, by a decrease in pixel size with a corresponding increase in the number of pixels. The total number of pixels required has also increased as the size of the screen used for display has increased.

To improve performance with the increasing demands upon the rendering system, designers are employing varying techniques to add parallelism in the rendering process. One such technique divides the display's screen space into multiple regions. If a primitive or any portion of a primitive lies within a region, then that region is selected for further processing by a rasterizer that will ultimately render the image contained in that region. Parallelism can now be obtained by having multiple rasterizers available which can be independently assigned to the screen regions that have objects to be rendered, thus allowing multiple objects to be simultaneously rendered.

Typical systems render a straight line segment via a stepping algorithm. A starting point on the display for the line is determined with the pixel corresponding to that point being illuminated. The next pixel to be illuminated is determined by stepping along the major axis one pixel position and then computing the value of the pixel in the minor axis direction. The major axis is defined as that axis to which the line to be rendered forms an included angle of less than or equal to 45 degrees. The minor axis then is the other axis of a Cartesian coordinate system. For example, if the line to be rendered forms an included angle of 37 degrees to the x-axis, then the x-axis is considered to be the major axis and the y-axis the minor axis. In like manner, the next pixel to be illuminated is determined by again stepping one pixel position along the major axis, which is the x-axis in the example, and then computing the corresponding minor axis position, the y-axis in the example, of the pixel on the line to be rendered. This process is repeated until the end of the line is reached. In a region-based rasterizer system, what is desired is a technique that focuses only on the portion of the line within the region currently being processed rather than a traditional technique of starting at the beginning of the line segment and processing to the end, crossing potentially many different regions.

SUMMARY OF THE INVENTION

As noted earlier, previous methods for rendering straight line segments have typically used a single rasterizer to generate all the pixels for a given line from the start of the line to the end of the line without regard to regions or region boundaries. With region-based rasterization however, it is possible that a single line might have several rasterizers generating pixels for that line, each operating within its assigned screen region. By identifying which regions the line passes thru, only rasterizers assigned to those regions need to be activated to process the line, freeing rasterizers assigned to the other regions to process primitives appearing in their regions. Techniques disclosed herein limit the area of the screen that must be considered in drawing the straight line segment providing for more computationally-efficient techniques. In the following detailed description and in the several figures of the drawings, like elements are identified with like reference numerals.

In one embodiment of the invention, a method for selecting a screen region on a screen of a monitor of a computer graphics display system to activate in rendering a straight line segment is disclosed. The method includes the steps of aligning a rectangular grid to screen region boundaries, wherein the screen includes a screen space divided into at least one screen region, locating a first and second endpoints of the straight line segment on the screen space, defining a rectangular bounding box in the screen space having vertices at the first and second endpoints, identifying each screen region that at least partially overlaps the bounding box, and selecting each identified screen region through which the straight line segment passes to activate for rendering the straight line segment on the screen.

BRIEF DESCRIPTION OF THE DRAWINGS

The accompanying drawings provide visual representations which will be used to more fully describe the invention and can be used by those skilled in the art to better understand it and its inherent advantages. In these drawings, like reference numerals identify corresponding elements.

DETAILED DESCRIPTION OF THE PREFERRED EMBODIMENTS

Figure 1A:
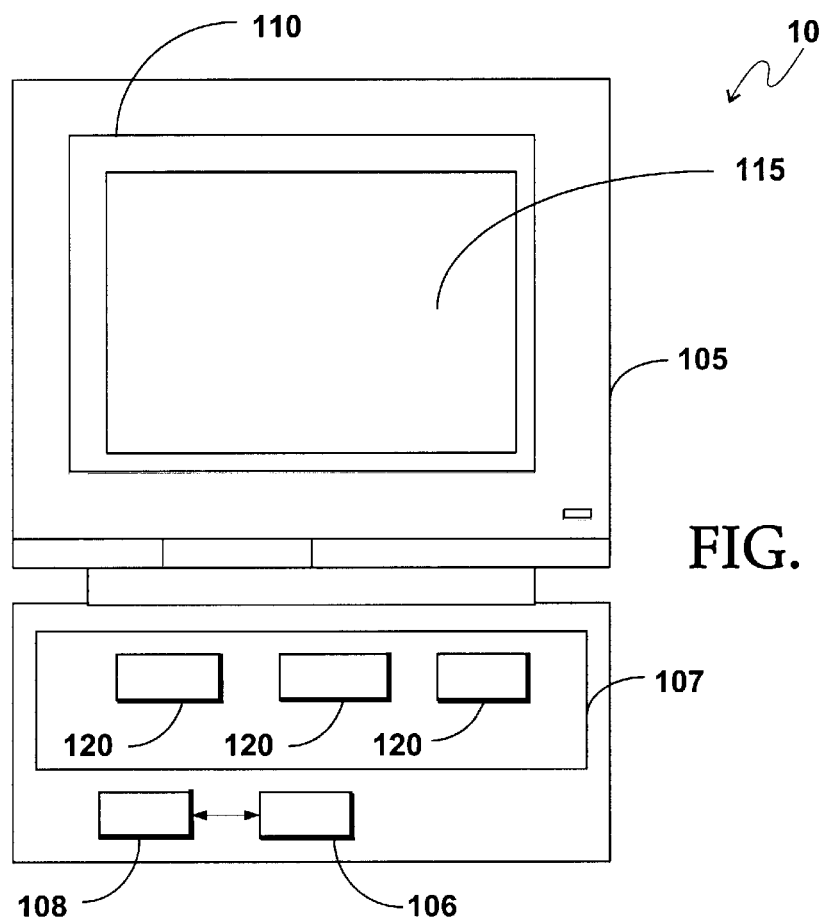
FIG. 1A is a drawing of a computer graphics display system as described in various representative embodiments consistent with the teachings of the invention.

As shown in the drawings for purposes of illustration, novel techniques are shown in a computer graphics display system for selecting regions of a screen to activate in rendering a straight line segment, for selecting pixels to activate in rendering the straight line segment, and for selecting pixels to activate in rendering an auxiliary area of the straight line segment required in cases wherein the straight line segment has a width of greater than one pixel. In existing region-based rasterizers, every line primitive is processed in every region to determine whether any pixels are active in that region. By selecting regions to activate or consider, techniques disclosed herein limit the area of the screen that must be considered in drawing the straight line segment, thereby providing for more computationally-efficient techniques. In the following detailed description and in the several figures of the drawings, like elements are identified with like reference numerals.

In representative embodiments, the following paragraphs disclose methods for (1) selecting regions of the screen to activate in rendering a straight line segment in a computer graphics display system, (2) selecting pixels to activate in rendering the straight line segment in the computer graphics display system, and (3) selecting screen regions to activate in rendering the auxiliary area of a straight line segment required in cases wherein the straight line segment has a width in a computer graphics display system.

FIG. 1A is a drawing of a computer graphics display system 100 as described in various representative embodiments consistent with the teachings of the invention. The computer graphics display system 100 of FIG. 1 comprises a computer monitor 105, a central processing unit (CPU) 106, a memory 108, and a graphics control system 107. The monitor 105 comprises a screen 110 conceptually having a screen space 115. The graphics control system 107 comprises at least one rasterizer 120.

Figure 1B:
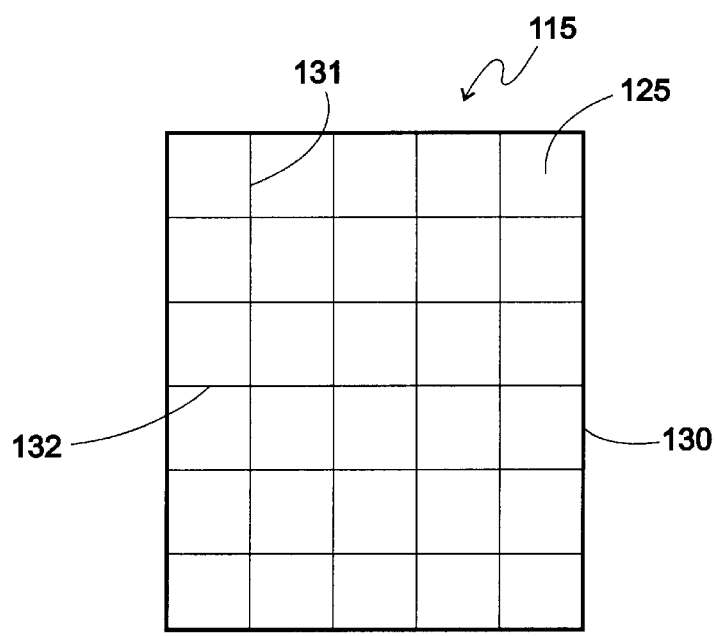
FIG. 1B is a drawing of the screen space of the computer graphics display system as described in various representative embodiments consistent with the teachings of the invention.

FIG. 1B is a drawing of the screen space 115 of the computer graphics display system 100 as described in various representative embodiments consistent with the teachings of the invention. The screen space 115 is conceptually divided into at least one screen region 125, also referred to herein as region 125, by vertical and horizontal grid lines 131,132, respectively, which together form a rectangular grid 130. While thirty screen regions 125 are shown in the example of FIG. 1B, for clarity of illustration, only one is shown with its associated identifying numeral.

Graphics systems are computationally intensive systems. As such, a valuable increase in system performance can be obtained via dividing the screen space 115 into multiple regions 125 and ignoring certain regions 125 in the rendering of primitives such as a line segment. Additional increases in system performance can be obtained via the parallel processing afforded by the use of multiple rasterizers 120. Graphics systems which divide screen space 115 into multiple regions 125 with specified rasterizers 120 assigned to perform rasterization for specified regions of the screen space 115 are referred to as multiple region or tile-based rasterizer systems. In the representative embodiment of figure 1B, each screen region 125 can be associated with one of the rasterizers 120. In another representative embodiment, a given rasterizer 120 could be responsible for the processing of more than one region 125. The assignment of rasterizers 120 to regions 125 could be either statically or dynamically performed.

Figure 2:
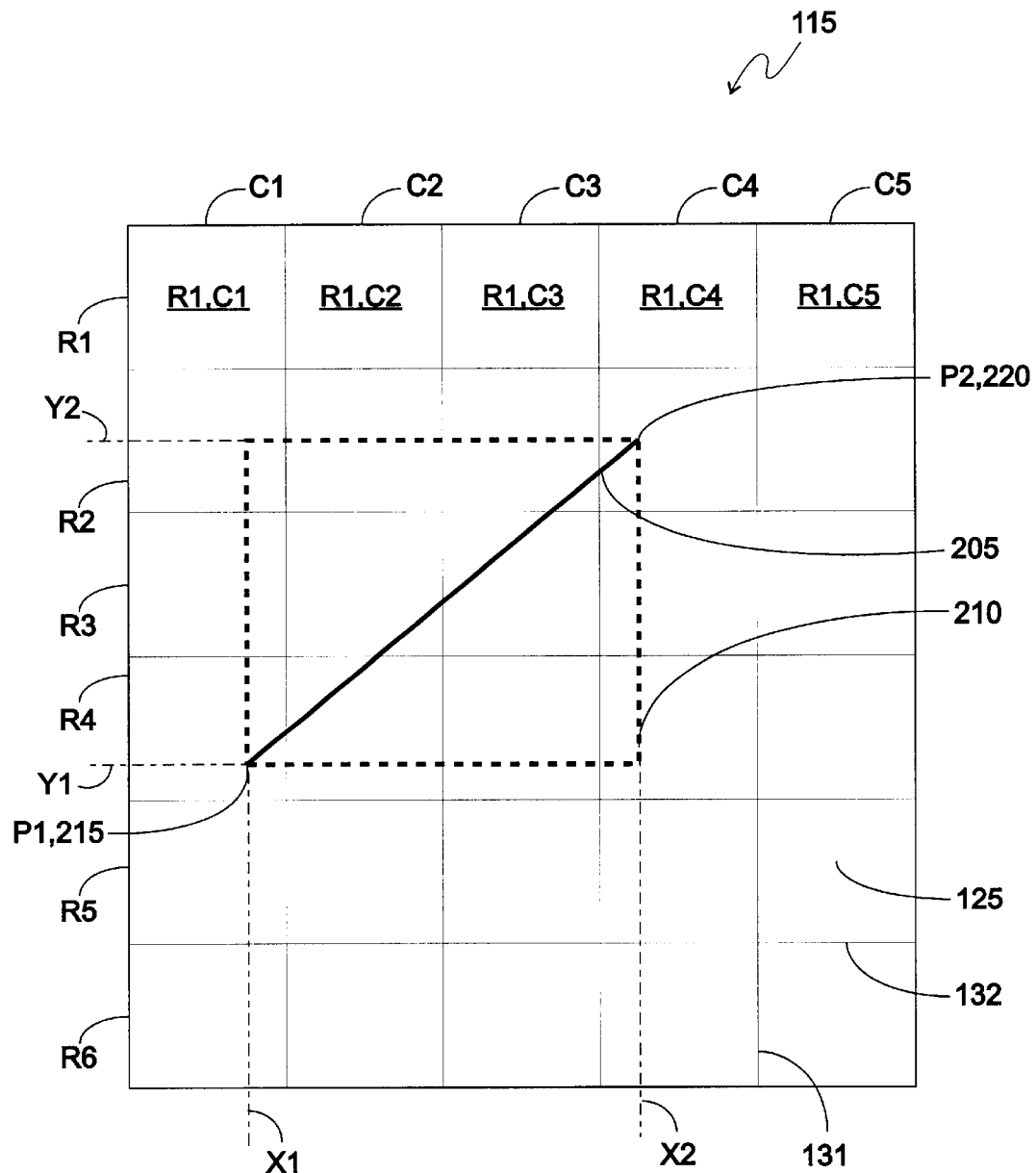
FIG. 2 is a drawing of another screen space of the computer graphics display system as described in various representative embodiments consistent with the teachings of the invention.

FIG. 2 is a drawing of another screen space 115 of the computer graphics display system 100 as described in various representative embodiments consistent with the teachings of the invention. In the example of FIG. 2, the screen space 115 is once again shown conceptually divided into thirty screen regions 125 by vertical and horizontal grid lines 131,132, respectively, which together form rectangular grid 130. While thirty screen regions 125 are shown in the example of FIG. 2, again for clarity of illustration, only one is shown with its associated identifying numeral. Screen space 115 is shown divided horizontally into first, second, third, fourth, and fifth region columns C1 . . . C5 and vertically into first, second, third, fourth, fifth, and sixth region rows R1 . . . R6 with individual screen regions 125 of the first region row R1 being indicated as R1,C1 . . . R1,C5.

A straight line segment 205 is drawn in screen space 115 of FIG. 2. The straight line segment 205 has a first end point P1 having x and y coordinates (X1,Y1) of a Cartesian coordinate system and a second end point P2 having x and y coordinates (X2,Y2). A bounding box 210 which identifies the extent of the screen 110 region that is of concern in displaying the straight line segment 205 is conceptually defined on the screen space 115 by the first and second end points P1,P2 wherein the bounding box has a first and second corners 215,220. The first corner 215 of the bounding box 210 is defined by the coordinates (min(X1,X2), min(Y1,Y2)), and the second corner 220 of the bounding box 210 is defined by the coordinates (max(X1,X2), max(Y1,Y2)), where min(a,b) returns the minimum of the two values a and b, and max(a,b) returns the maximum of the two values a and b. The rectangular grid 130 is located on the boundaries of the screen regions 125. The extent of this grid 130 should be large enough to include the bounding box 210. Any part of the screen space 115 outside of this extent is guaranteed not to have any part of the straight line segment 205 contained within it.

Note that in the example of FIG. 2, first end point P1 and first corner 215 are coincident, and second end point P2 and second corner 220 are coincident. However, had the slope of the straight line segment 205 been negative instead of positive as in FIG. 2, the first corner 215 would have still been at the lower left hand corner of the bounding box 210, and the second corner 220 would have still been at the upper right hand corner of the bounding box 210 while the first and second end points P1,P2 would have been located respectively at the upper left hand corner and lower right hand corners of the bounding box 210. Other designations are also possible in defining the bounding box 210.

A first objective is to determine which of the screen regions 125 will be activated in displaying the straight line segment 205 on the screen 110 of the monitor 105. Only those screen regions 125 through which the straight line segment 205 passes will need to be activated. All other screen regions 125 can be ignored in the display of that straight line segment 205. As a first step, select all screen regions that are contained wholly or in part within the bounding box identified above. The following discussion is preferably independently applied to each of the identified screen regions.

The general equation of a straight line is $A*x+B*y+C=0$, which for the example of the straight line segment 205 of FIG. 2 results in $A=(Y2-Y1)$, $B=(X1-X2)$, and $C=-(A*X1+B*Y1)$.

Figure 3A:
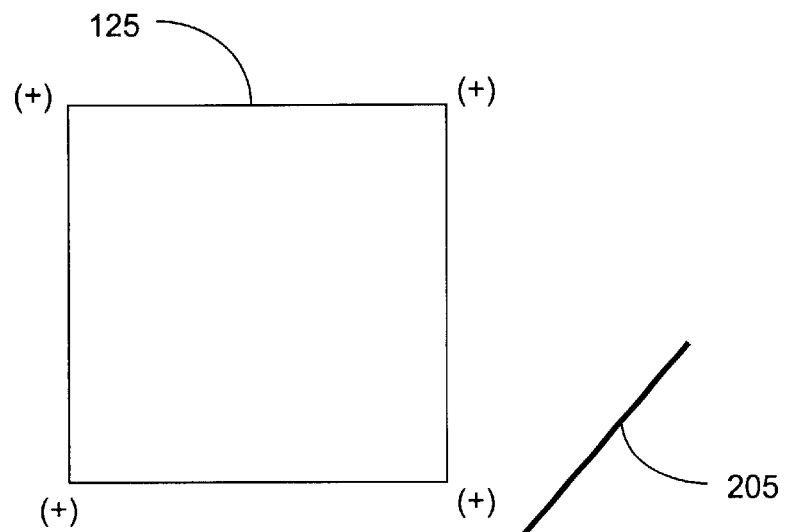
FIGS. 3A–3C are various representations of a screen region of the computer graphics display system as described in illustrative embodiments consistent with the teachings of the invention.
Figure 3B:
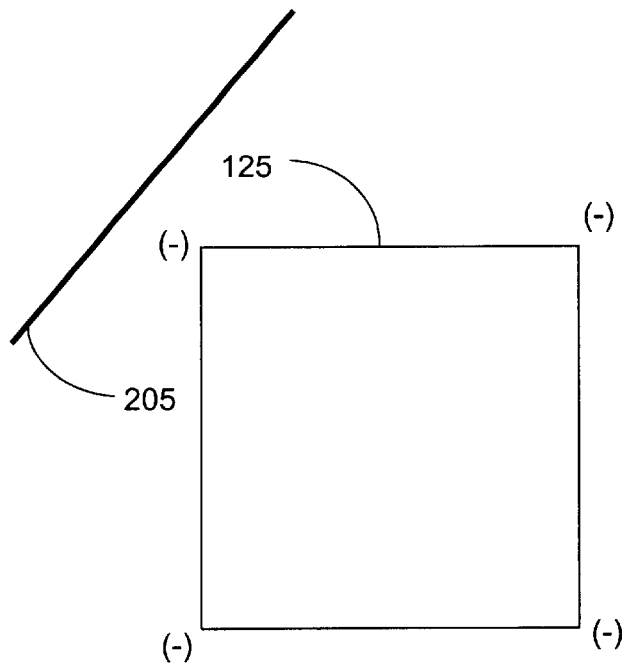
Figure 3C:
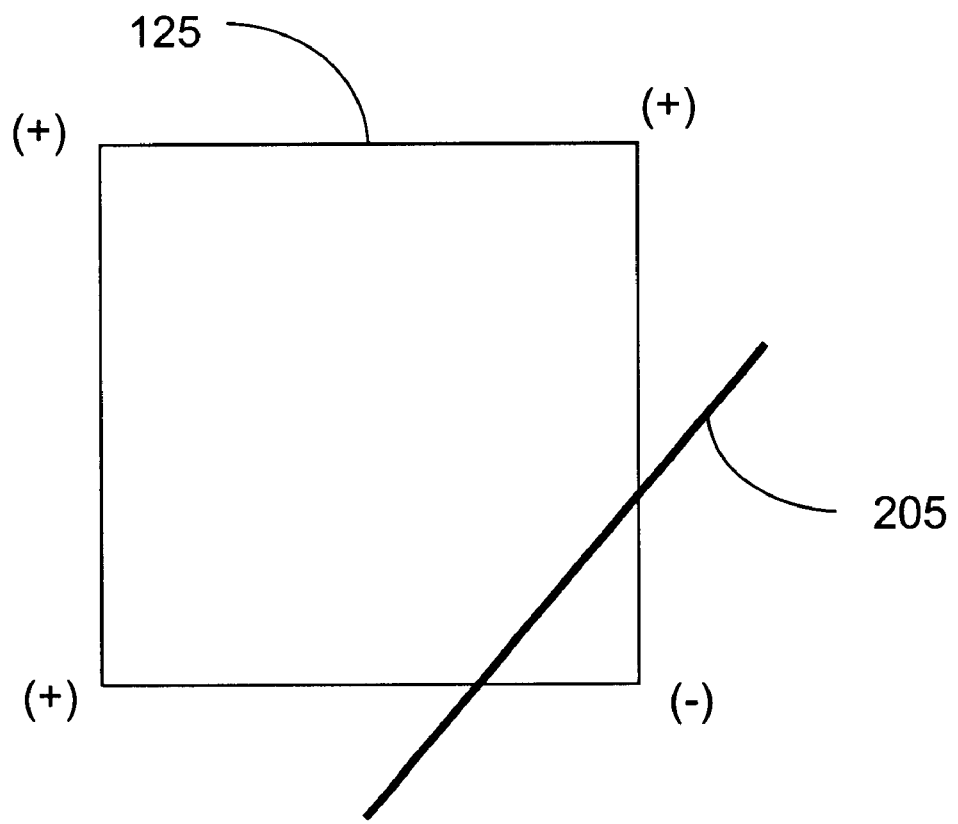

FIG. 3A–3C are various representations of a screen region 125 of the computer graphics display system 100 as described in illustrative embodiments consistent with the teachings of the invention. FIG. 3A shows a single screen region 125 of the thirty shown in FIG. 2. The particular screen region 125 of FIG. 3A has the straight line segment 205 passing below the screen region 125 and its lower right hand corner, similar to that for the screen region 125 identified in FIG. 2 by region row R2 and region column C2. To determine mathematically whether or not the straight line segment 205 passes through the screen region 125 of FIG. 3A, it is only necessary to evaluate the expression $A*x+B*y+C$ at each of the four corners of the screen region 125 of FIG. 3A where the constants A,B, and C are determined as indicated above for the straight line segment 205. For FIG. 3A, this expression is positive for each corner as indicated by the "(+)" symbol shown at each corner in FIG. 3A. For this case, each of the four corners of the screen region 125 of FIG. 3A lies above the straight line segment 205 indicating that the straight line segment 205 does not pass through this screen region 125, and therefore this screen region 125 is not selected for further processing in displaying the straight line segment 205 on the screen 110.

FIG. 3B shows a single screen region 125 of the thirty shown in FIG. 2. The particular screen region 125 of FIG. 3B has the straight line segment 205 passing above the screen region 125 and its upper left hand corner, as it does for the screen region 125 identified in FIG. 2 by region row R4 and region column C3. To determine mathematically whether or not the straight line segment 205 passes through the screen region 125 of FIG. 3B, it is only necessary to evaluate the expression $A*x+B*y+C$ at each of the four corners of the screen region 125 of FIG. 3B where the constants A, B, and C are determined as indicated above for the straight line segment 205. For FIG. 3B, this expression is negative for each corner as indicated by the "(−)" symbol shown at each corner in FIG. 3B. For this case, each of the four corners of the screen region 125 of FIG. 3B lies below the straight line segment 205 indicating that the straight line segment 205 does not pass through this screen region 125, and therefore this screen region 125 is not selected for further processing in displaying the straight line segment 205 on the screen 110.

FIG. 3C shows a single screen region 125 of the thirty shown in FIG. 2. The particular screen region 125 of FIG. 3C has the straight line segment 205 passing through the lower right hand section of the screen region 125, as it does for the screen region 125 identified in FIG. 2 by region row R3 and region column C2. To determine mathematically whether or not the straight line segment 205 passes through the screen region 125 of FIG. 3C, it is only necessary to evaluate the expression $A*x+B*y+C$ at each of the four corners of the screen region 125 of FIG. 3C where the constants A, B, and C are determined as indicated above for the straight line segment 205. For FIG. 3C, this expression is positive for three of the corners as indicated by the "(+)" symbol near the lower left hand corner, the upper left hand corner, and the upper right hand corner of this screen region 125 and negative for one corner of this screen region 125 as indicated by the "(−)" symbol shown at the lower right hand corner. For this case, three of the four corners of the screen region 125 of FIG. 3B lies above the straight line segment 205 and one lies below indicating that the straight line segment 205 does indeed pass through this screen region 125, and therefore this screen region 125 is selected for further processing, or activated in displaying the straight line segment 205 on the screen 110.

Whenever evaluating the expression $A*x+B*y+C$ at all four corners of any given screen region 125, produces results that have the same algebraic signs, the straight line segment 205 does not pass through that screen region 125, and the corresponding screen region 125 will preferably not be activated in displaying the straight line segment 205 on the screen 110. Whenever evaluating the expression $A*x+B*y+C$ at all four corners of any given screen region 125, produces results that have at least one algebraic sign that differs from the others, the straight line segment 205 does pass through that screen region 125, and the corresponding screen region 125 will be activated in displaying the straight line segment 205 on the screen 110.

Figure 4:
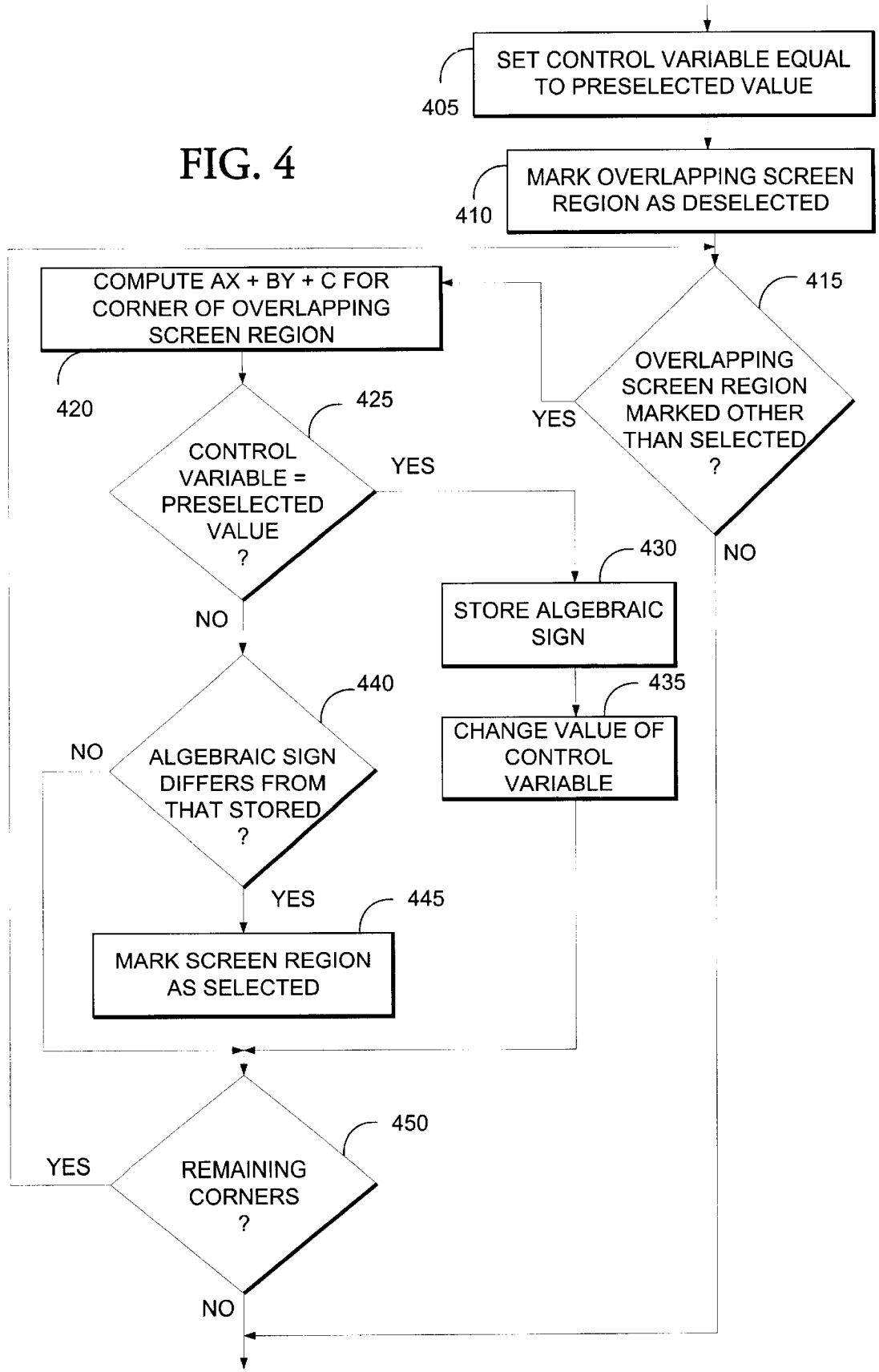
FIG. 4 is an illustrative flow chart of a method for selecting screen regions to activate in rendering a straight line segment as described in various representative embodiments consistent with the teachings of the invention.

FIG. 4 is an illustrative flow chart of a method for selecting screen regions 125 to activate in rendering a straight line segment 205 as described in various representative embodiments consistent with the teachings of the invention. This method would be preferably applied in turn against each screen region selected to test.

In block 405, a control variable is set equal to a preselected value, which could be for example the number "0". Block 405 then transfers control to block 410.

In block 410, the overlapping screen region 125 is marked as other than selected. Block 410, then transfers control to block 415.

In block 415, when the overlapping screen region 125 is marked as other than selected, block 410 transfers control to block 420. Otherwise, block 415 terminates the process.

In block 420, the expression A*x+B*y=C is computed for a corner of one of the identified overlapping screen regions 125. Block 420, then transfers control to block 425.

In block 425, when the control variable is equal to the preselected value, block 425 transfers control to block 430. Otherwise, block 425 transfers control to block 440.

In block 430, the algebraic sign of the result of the computation of the expression A*x+B*y+C obtained in block 420 is stored. Block 430 then transfers control to block 435.

In block 435, the value of the control variable is changed from its preselected value to something else, which could be for example the number "1". Block 435 then transfers control to block 450.

In block 440, when the algebraic sign of the result of the computation of the expression A*x+B*y+C obtained in block 420 differs from that stored in block 430, block 440 transfers control to block 445. Otherwise, block 440 transfers control to block 450.

In block 445, the overlapping screen region 125 is marked as selected. Block 445 then transfers control to block 450.

In block 450, when there are remaining corners of the overlapping screen region 125 for which in block 420 the expression A*x+B*y+C have not been computed, block 450 transfers control to block 415. Otherwise, block 450 terminates the process.

A second objective is to determine which pixels in displaying the straight line segment 205 on the screen 110 of the monitor 105 are illuminated within each of the activated screen regions 125. Only those pixels through which the straight line segment 205 passes may need to be illuminated. All others can be ignored in the display of that straight line segment 205.

Figure 5:
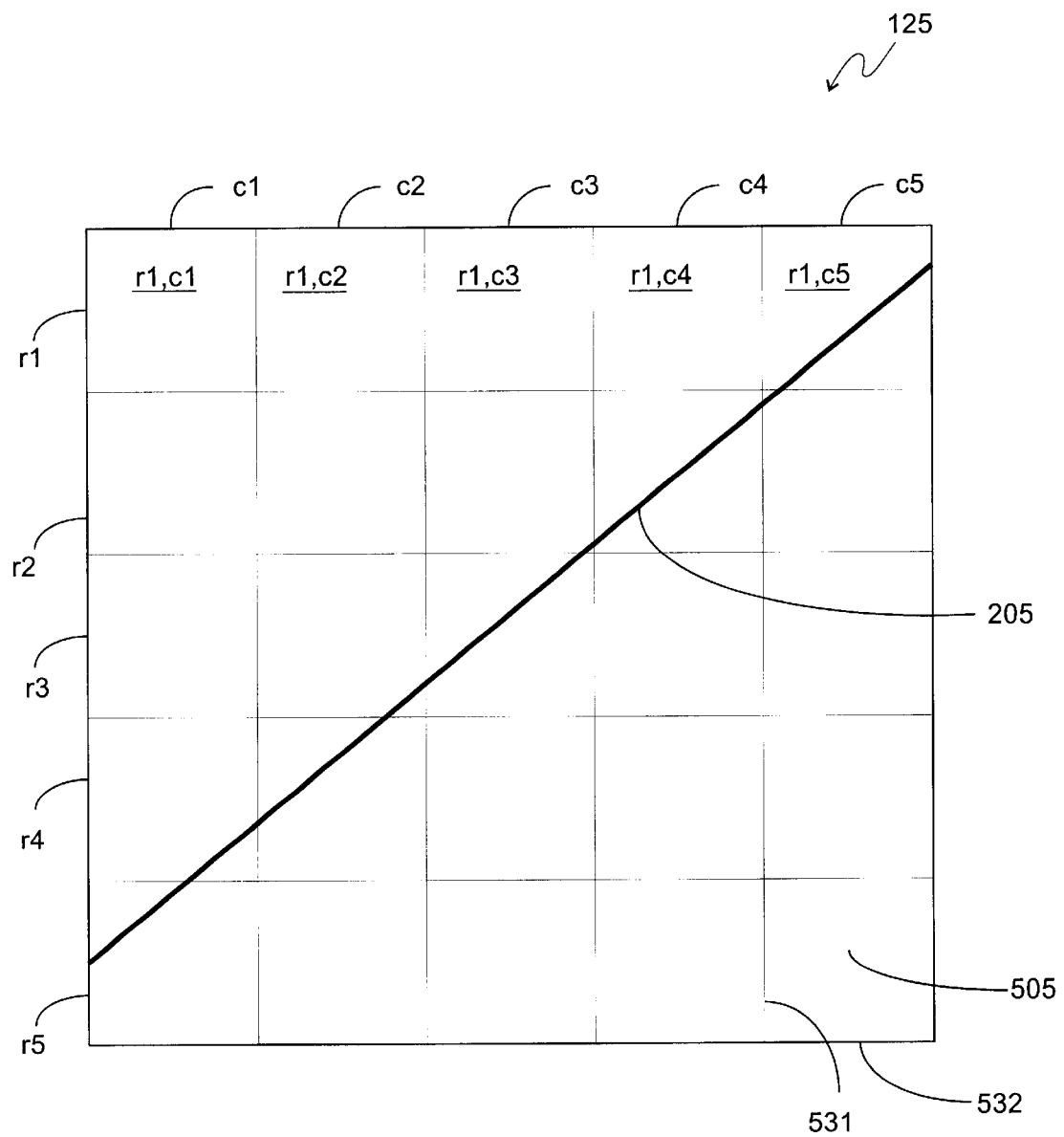
FIG. 5 is a drawing of a portion of the screen space of the computer graphics display system as described in various representative embodiments consistent with the teachings of the invention.

FIG. 5 is a drawing of a portion of the screen space 115 of the computer graphics display system 100 as described in various representative embodiments consistent with the teachings of the invention. In the example of FIG. 2, the portion of the screen space 115 shown is that occupied by a single screen region 125. The screen region 125 of FIG. 5 is divided into multiple pixels 505. While twenty-five pixels 505 are drawn in the example of FIG. 5, for clarity of illustration, only one is shown with its associated identifying numeral. The screen region 125 of FIG. 5 is shown conceptually divided into pixels 505 by vertical and horizontal grid lines 531,532, respectively, which together form a finer gradation of the rectangular grid 130. The rectangular grid 130 is aligned to the boundaries of the pixels 505. The screen space 115 occupied by the screen region 125 of FIG. 5 is shown divided horizontally into pixel first, second, third, fourth, and fifth columns c1 ... c5 and vertically into first, second, third, fourth, and fifth pixel rows r1 ... r5 with individual pixels 505 of the first pixel row r1 being indicated as r1,c1 ... r1,c5.

FIGS. 6A–6J are various representations of one pixel 505 of the screen space 115 of the computer graphics display system 100 as described in illustrative embodiments consistent with the teachings of the invention. The pixel 505 has a width 640 and a height 645 as its dimensions. A center 650 of the pixel 505 is located at a distance equal to one-half that of the width 640 from a left edge 660 and at a distance equal to one-half that of the height 645 from a lower edge 665. In other words, the lines of the rectangular grid 130 lie half way between the centers 650 of the pixels 505.

Figure 6A:
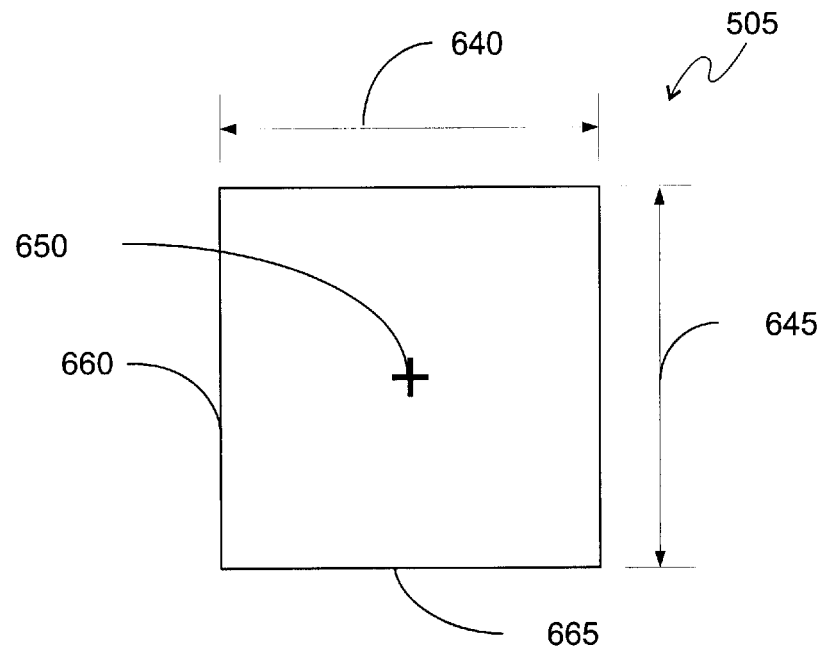
FIGS. 6A–6J are various representations of one pixel of the screen space of the computer graphics display system as described in illustrative embodiments consistent with the teachings of the invention.
Figure 6B:
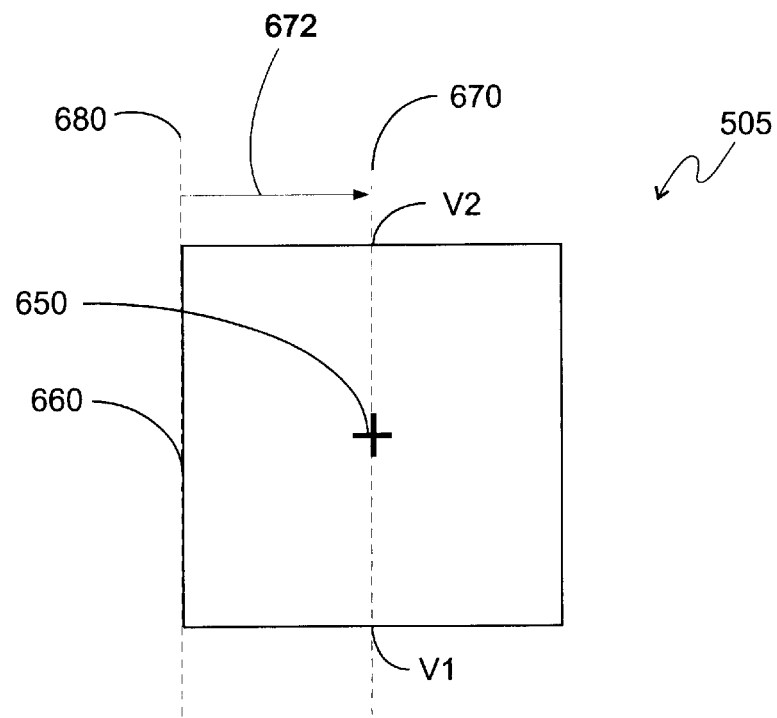
Figure 6C:
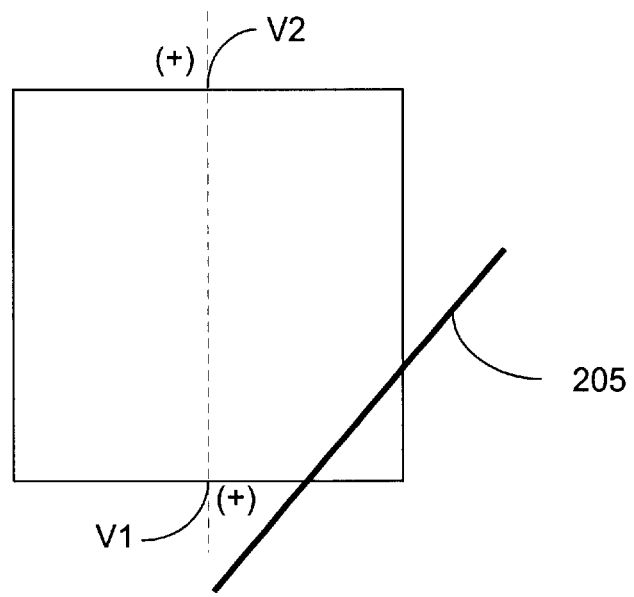
Figure 6D:
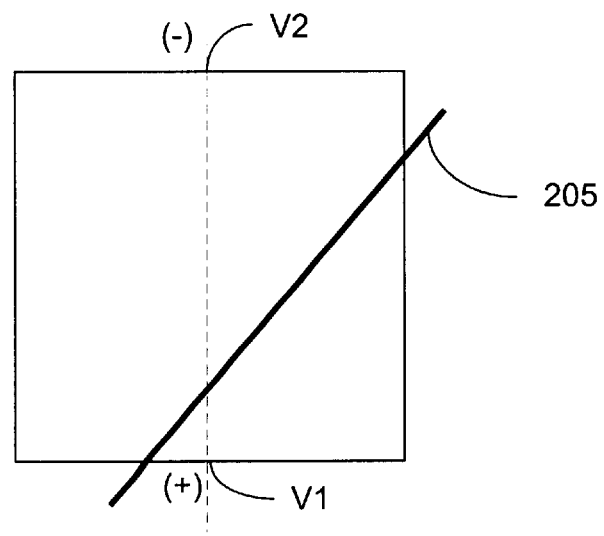
Figure 6E:
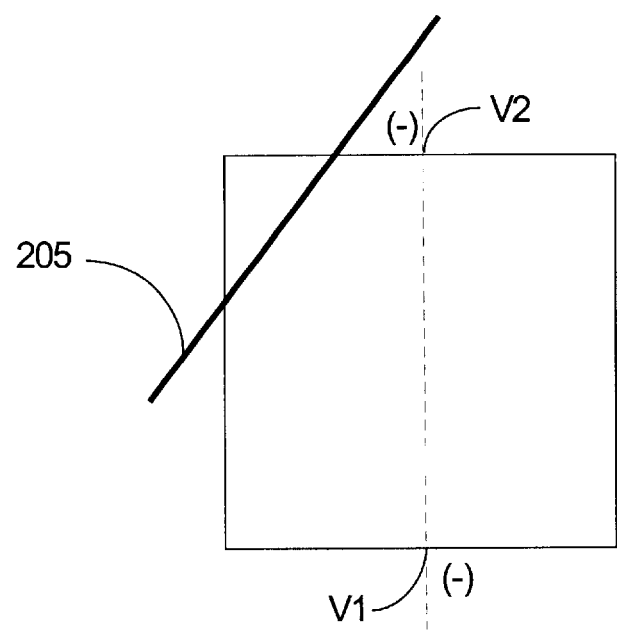

In FIG. 6B, a vertical offset-grid line 670 passes through the center 650 of the pixel 505. The vertical offset-grid line 670 is formed by offsetting a left grid line 680 of the pixel 505 to the right from its nominal position by ½ its width 640. This movement is shown by first offset 672. The left grid line 680 is co-linear with the left edge 660 of the pixel 505. The vertical offset-grid line 670 intersects the pixel 505 boundaries at upper and lower intersection points V1 and V2. In order to determine mathematically whether or not to illuminate the pixel 505, it is only necessary to evaluate the expression A*x+B*y+C at each of the two points V1 and V2. FIGS. 6C–6E illustrate the results for three separate conditions of straight line segments 205 passing through the pixel 505.

Evaluating the expression A*x+B*y+C at the two points V1 and V2 results in a positive value for each point as indicated by the "(+)" symbol shown adjacent to the points. Since both points have the same algebraic sign for the expression A*x+B*y+C, the pixel 505 in question is preferably not illuminated for the straight line segment 205 shown in FIG. 6C.

Evaluating the expression A*x+B*y+C at the two points V1 and V2 results in a positive value for point V1 as indicated by the "(+)" symbol shown adjacent to point V1 and in a negative value for point V2 as indicated by the "(−)" symbol shown adjacent to point V2. Since the points have different algebraic signs for the expression A*x+B*y+C, the pixel 505 in question is illuminated for the straight line segment 205 shown in FIG. 6D.

Evaluating the expression A*x+B*y+C at the two points V1 and V2 results in a negative value for each point as indicated by the "(−)" symbol shown adjacent to the points. Since both points have the same algebraic sign for the expression A*x+B*y+C, the pixel 505 in question is preferably not illuminated for the straight line segment 205 shown in FIG. 6E.

Figure 6F:
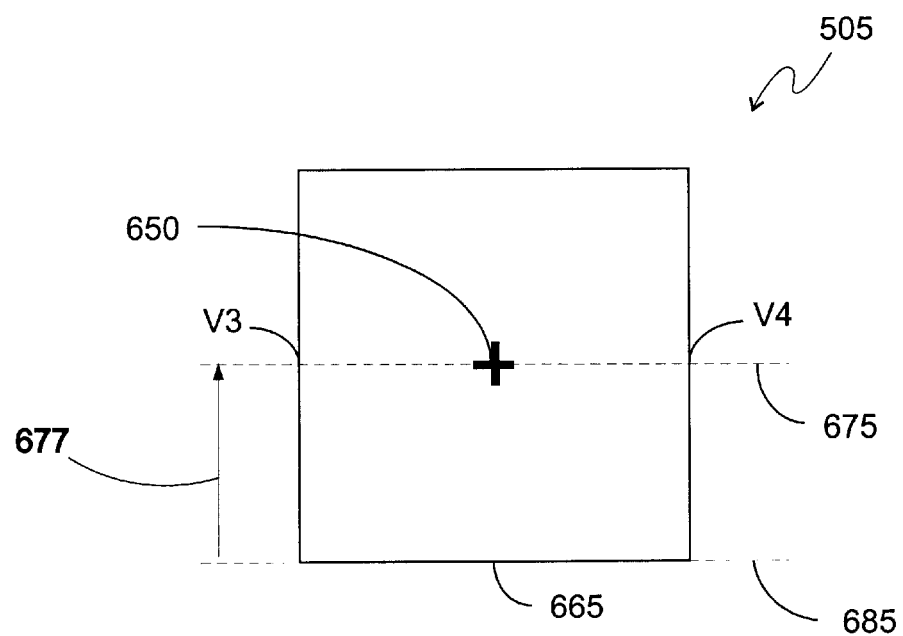
Figure 6G:
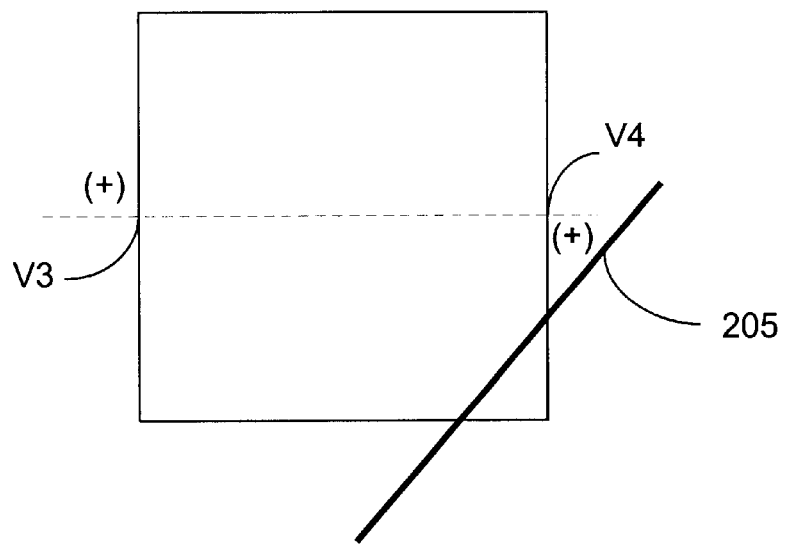
Figure 6H:
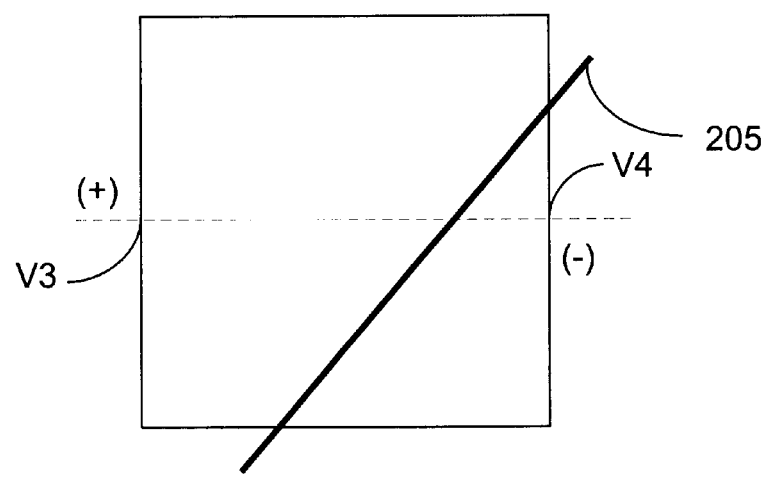
Figure 6I:
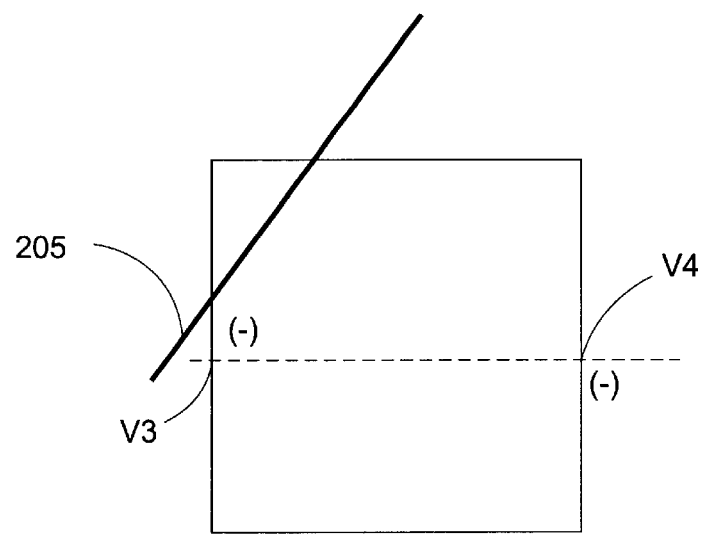
Figure 6J:
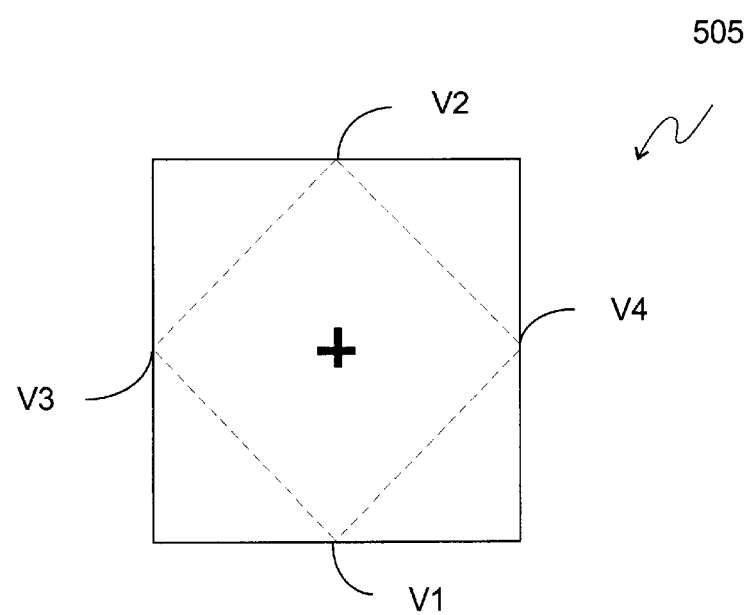

In FIG. 6F, a horizontal offset-grid line 675 passes through the center 650 of the pixel 505. The horizontal offset-grid line 675 is formed by offsetting a lower grid line 685 of the pixel 505 up from its nominal position by ½ its height 645. This movement is shown by second offset 677. The lower grid line 685 is co-linear with the lower edge 665 of the pixel 505. The horizontal offset-grid line 675 intersects the pixel 505 boundaries at lower and upper points V3 and V4. In order to determine mathematically whether or not to illuminate the pixel 505, it is only necessary to evaluate the expression A*x+B*y+C at each of the two points V3 and V4 if the decision had not already been to illuminate the pixel 505 in the steps described in connection with FIGS. 6C–6E. FIGS. 6G–6I illustrate the results for three separate conditions of straight line segments 205 passing through the pixel 505.

Evaluating the expression A*x+B*y+C at the two points V3 and V4 results in a positive value for each point as indicated by the "(+)" symbol shown adjacent to the points. Since both points have the same algebraic sign for the expression A*x+B*y+C, the pixel 505 in question is preferably not illuminated for the straight line segment 205 shown in FIG. 6G.

Evaluating the expression A*x+B*y+C at the two points V3 and V4 results in a positive value for point V3 as indicated by the "(+)" symbol shown adjacent to point V3 and in a negative value for point V4 as indicated by the "(−)" symbol shown adjacent to point V4. Since the points have different algebraic signs for the expression A*x+B*y+C, the pixel 505 in question is illuminated for the straight line segment 205 shown in FIG. 6H.

Evaluating the expression A*x+B*y+C at the two points V3 and V4 results in a negative value for each point as indicated by the "(−)" symbol shown adjacent to the points. Since both points have the same algebraic sign for the expression A*x+B*y+C, the pixel 505 in question is preferably not illuminated for the straight line segment 205 shown in FIG. 6I.

In any of the above cases, if the evaluation of the expression A*x+B*y+C results in opposite algebraic signs whether in an evaluation for the pair of points V1 and V2 or the pair of points V3 and V4, the pixel 505 in question is illuminated regardless of the results of the evaluation of the other pair of points. Thus, if one pair of points is evaluated and found to have differing algebraic signs, it is not necessary to evaluate the two remaining points.

If any two of the points V1,V2,V3,V4 are found to have different algebraic points, the pixel 505 in question is illuminated. Computation of algebraic signs for successive points does not need to continued after one differing sign is found. The situation of FIG. 6J corresponds to the straight line segment 205 crossing any part of the area of the pixel 505 enclosed by the dotted lines connecting points V1,V2, V3,V4.

Figure 7:
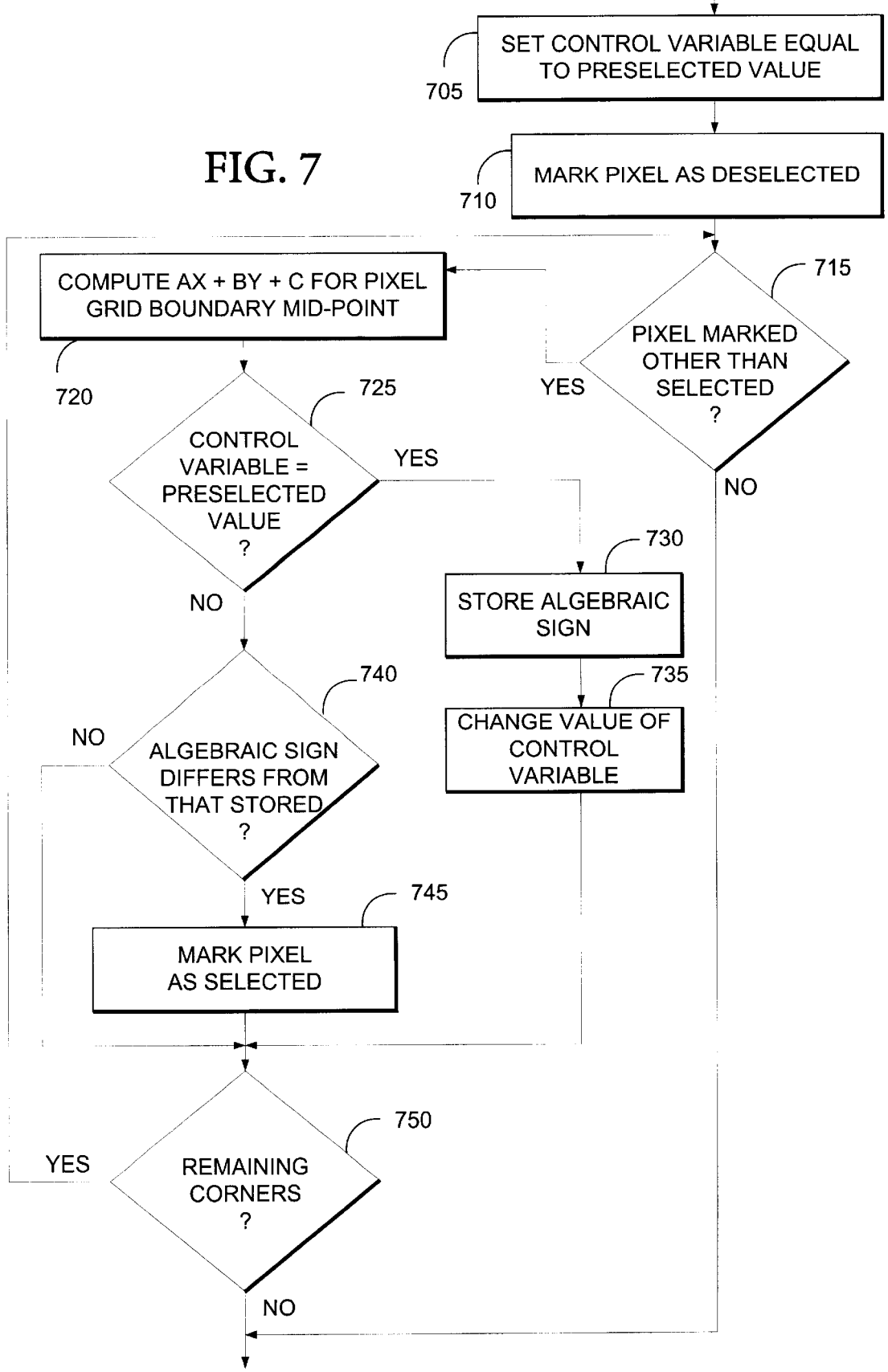
FIG. 7 is an illustrative flow chart of a method for selecting pixels to activate in rendering a straight line segment as described in various representative embodiments consistent with the teachings of the invention.

FIG. 7 is an illustrative flow chart of a method for selecting pixels 505 to activate in rendering a straight line segment 205 as described in various representative embodiments consistent with the teachings of the invention.

In block 705, a control variable is set equal to a preselected value, which could be for example the number "0". Block 705 then transfers control to block 710.

In block 710, the pixel 505 is marked as other than selected. Block 710, then transfers control to block 715.

In block 715, when the pixel 505 is marked as other than selected, block 710 transfers control to block 720. Otherwise, block 715 terminates the process.

In block 720, the expression A*x+B*y+C is computed for one of the pixel grid mid-points V1,V2,V3,V4. Block 720, then transfers control to block 725.

In block 725, when the control variable is equal to the preselected value, block 725 transfers control to block 730. Otherwise, block 725 transfers control to block 740.

In block 730, the algebraic sign of the result of the computation of the expression A*x+B*y+C obtained in block 720 is stored. Block 730 then transfers control to block 735.

In block 735, the value of the control variable is changed from its preselected value to some other value, which could be for example the number "1". Block 735 then transfers control to block 750.

In block 740, when the algebraic sign of the result of the computation of the expression A*x+B*y+C obtained in block 720 differs from that stored in block 730, block 740 transfers control to block 745. Otherwise, block 740 transfers control to block 750.

In block 745, the pixel 505 is marked as selected. Block 745 then transfers control to block 750.

In block 750, when there are remaining pixel grid points V1,V2,V3,V4 for which in block 720 the expression A*x+B*y+C have not been computed, block 750 transfers control to block 715. Otherwise, block 750 terminates the process.

A third objective is to identify which screen regions 125 will be activated in displaying the straight line segment 205 on the screen 110 of the monitor 105 for cases in which the line has a width. Some pixels may be illuminated within adjoining screen regions 125 due to the width of the line. However, only those screen regions 125 through which the straight line segment 205 including the width of the line passes will need to be activated. All others can be ignored in the display of that straight line segment 205. It should be noted that while the following discussion is in terms of straight line segments, the techniques disclosed are also applicable to points that are displayed with a width. Further, all references to width refer to dimensions in the minor axis direction.

Figure 8:
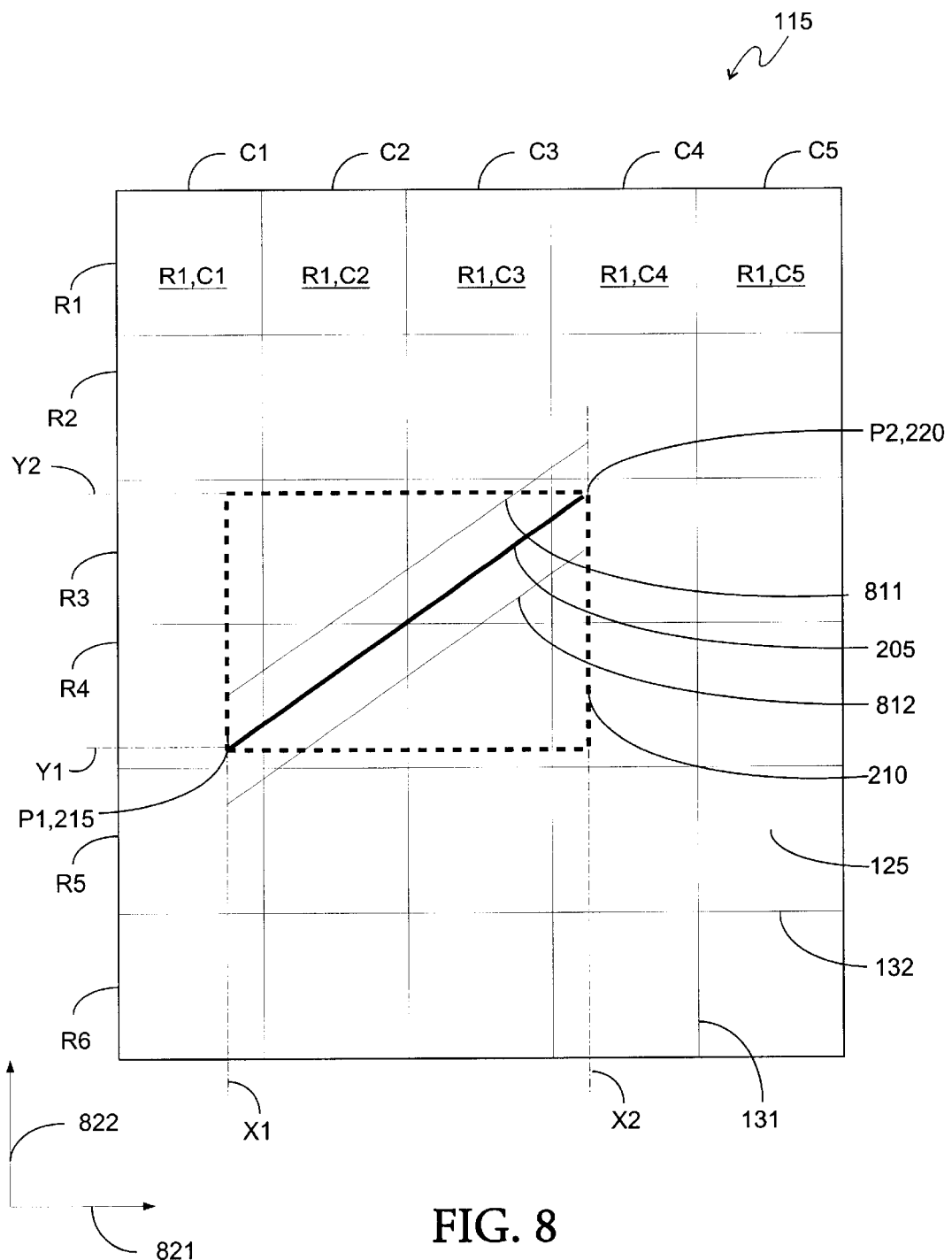
FIG. 8 is a drawing of yet another screen space of the computer graphics display system as described in various representative embodiments consistent with the teachings of the invention.

FIG. 8 is a drawing of yet another screen space 115 of the computer graphics display system 100 as described in various representative embodiments consistent with the teachings of the invention. The straight line segment 205 of FIG. 8 has first and second end points P1,P2 and a width which is indicated by upper and lower line boundaries 811,812.

In FIG. 8, the bounding box 210 is defined similar to that defined with respect to FIG. 2. The straight line segment 205 is conceptually defined on the screen space 115 by the first and second end points P1,P2 wherein the bounding box has first and second corners 215,220. The first corner 215 of the bounding box 210 is defined by the coordinates (min(X1, X2), min(Y1,Y2)) and (max(X1,X2), max(Y1,Y2)), where min(a,b) returns the minimum of the two values a and b, and max(a, b) returns the maximum of the two values a and b. The bounding box 210 is aligned with a major and a minor axis 821, 822 wherein the major axis 821 is identified as parallel to the longer of two adjacent sides of the bounding box 210 and the minor axis 822 is identified as parallel to the other side of the bounding box 210. The rectangular grid is located on the boundaries of the screen regions 125. The extent of this grid should be large enough to include the bounding box 210.

Note that in the example of FIG. 8, first end point P1 and first corner 215 are coincident, and second endpoint P2 and second corner 220 are coincident. However, had the slope of the straight line segment 205 been negative instead of positive as in FIG. 8, the first corner 215 would have still been at the lower left hand corner of the bounding box 210, and the second corner 220 would have still been at the upper right hand corner of the bounding box 210 while the first and second end points P1,P2 would have been located respectively at the upper left hand corner and lower right hand corners of the bounding box 210.

Due to the width of the straight line segment 205 in FIG. 8, the bounding box 210 just obtained above will not include the screen region 125 in region column C1 and region row R5, the screen region 125 in region column C2 and region row R5, the screen region 125 in region column C3 and region row R2, nor the screen region 125 in region column C4 and region row R2. Thus, if some adjustment is not made, those screen regions 125 will not be activated and the line 205 will not be displayed appropriately.

Figure 9:
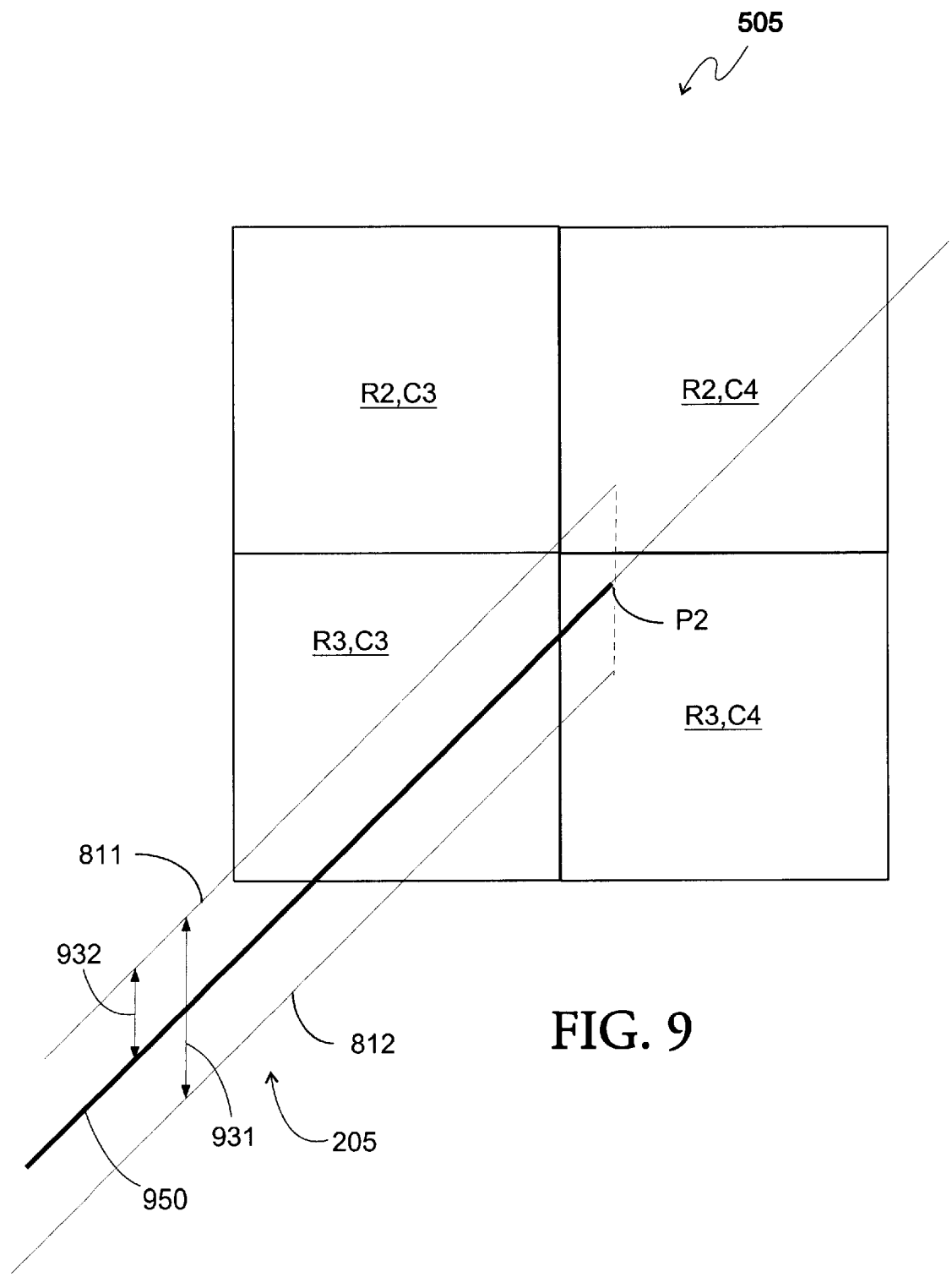
FIG. 9 is a drawing of adjacent screen regions in the screen space of the computer graphics display system as described in various representative embodiments consistent with the teachings of the invention.

FIG. 9 is a drawing of adjacent screen regions 125 in the screen space 115 of the computer graphics display system 100 as described in various representative embodiments consistent with the teachings of the invention. This figure is a magnified view of a portion of FIG. 8 comprising the screen regions 125 located at region row/column R2,C3; region row/column R2,C4; region row/column R3,C3; and region row/column R3,C4. A line-width 931 of the straight line segment 205 is shown in FIG. 9, as well as a one-half-line width 932. Line-upper and line-lower boundaries 811, 812 are shown around the centerline 950 of straight line segment 205. As can be seen from FIG. 9, the width of straight line segment 205 extends the straight line segment 205 into screen regions 125 located at region row/column R2,C3 and region row/column R2,C4.

Figure 10:
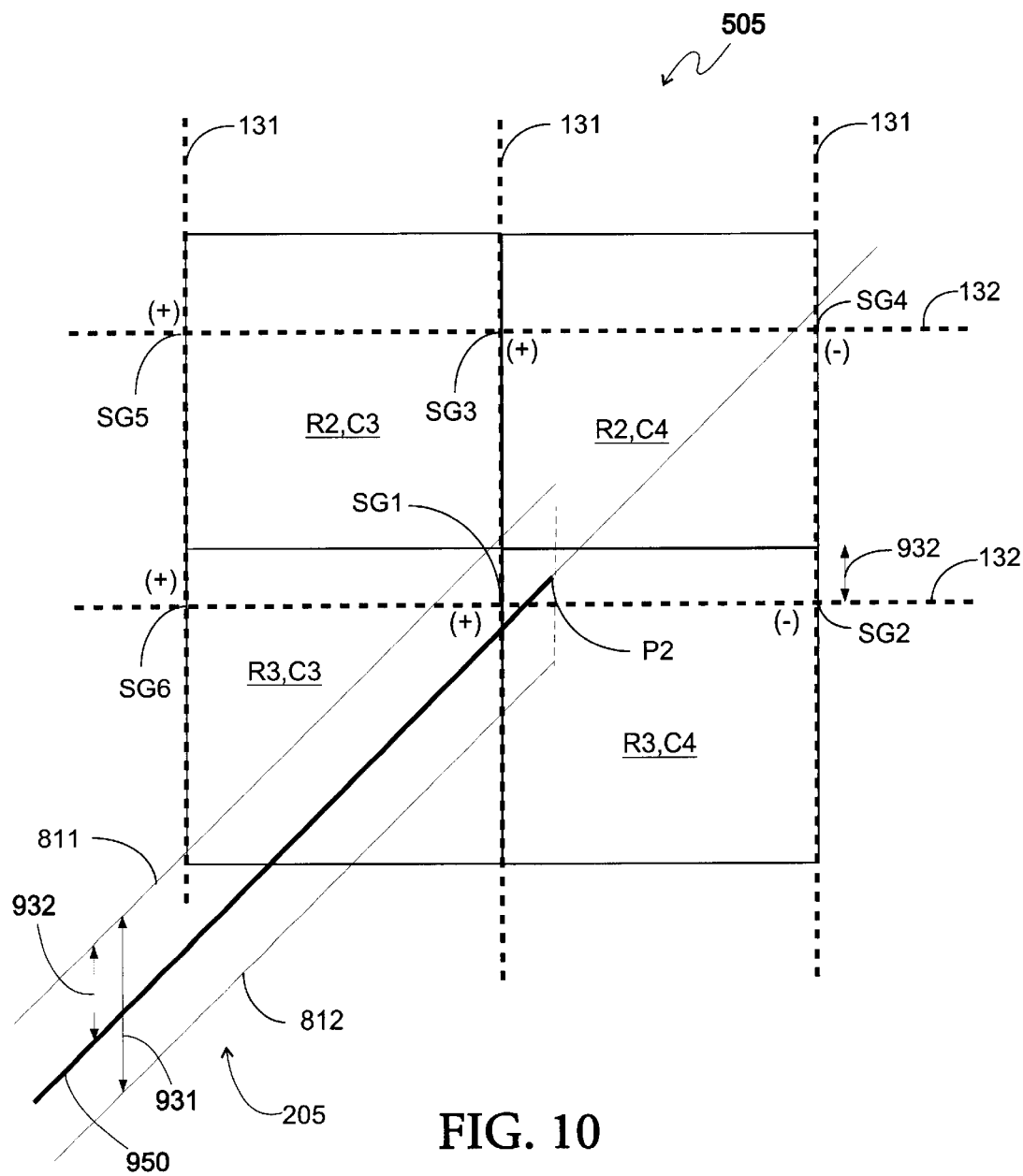
FIG. 10 is another drawing of adjacent screen regions in the screen space of the computer graphics display system as described in various representative embodiments consistent with the teachings of the invention.

FIG. 10 is another drawing of adjacent screen regions 125 in the screen space 115 of the computer graphics display system 100 as described in various representative embodiments consistent with the teachings of the invention. FIG. 10 shows the same area of the screen space 115 as found in FIG. 9 which once again is a magnified view of a portion of FIG. 8 comprising the screen regions 125 located at region row/column R2,C3; region row/column R2,C4; region row/column R3,C3; and region row/column R3,C4. In FIG. 10, the rectangular grid 130 around pixels 505 is moved downward along the minor axis 822 by an amount equal to that of one-half-line-width 932 as shown by dotted lines indicated as horizontal grid lines 132.

The expression A*x+B*y+C is then computed for region row/column R2,C4 at each of the shifted rectangular grid corners SG1, SG2, SG3, and SG4 one at a time for the new rectangular grid 130 location to determine the algebraic sign of the expression. Should the sign of one of the results of this computation differ from one of those previously computed, the computation is terminated and the screen region 125 is marked as activated in creating the straight line segment 205. Should all four corners have the same algebraic signs, unless otherwise activated the screen region 125 will preferably not be active in displaying the straight line segment 205. For the example of FIG. 10, the expression A*x+B*y+C has negative algebraic signs at shifted rectangular grid corners SG2 and SG4, whereas it has positive algebraic signs at shifted rectangular grid corders SG1 and SG3. Thus, the screen region 125 at region row/column R2,C4 is activated in rendering the straight line segment 205.

Repeating the computation of the expression A*x+B*y+C for region row/column R2,C3 at each of the shifted rectangular grid corners SG1, SG3, SG5, and SG6 one at a time for the new rectangular grid 130 location to determine the algebraic sign of the expression. Should the sign of one of the results of this computation differ from one of those previously computed, the computation is terminated and the screen region 125 is marked as activated in creating the straight line segment 205. Should all four corners have the same algebraic signs, unless otherwise activated the screen region 125 will preferably not be active in displaying the straight line segment 205. For the example of FIG. 10, the expression A*x+B*y+C has positive algebraic signs at shifted rectangular grid corners SG1, SG2, SG3, and SG4. Thus, the screen region 125 at region row/column R2,C3 is not activated in rendering the straight line segment 205. Note that since the expression A*x+B*y+C has previously been computed for SG1 and SG2 it does not have to be repeated if the system keeps track of such prior computations.

The above procedure is preferably further repeated as above except that the rectangular grid 130 around screen regions 125 is moved upward along the minor axis 822 by an amount equal to that of one-half-line-width 932 instead of downward as in FIG. 10. Computations for both upward and down shifts in the rectangular grid 130 around screen regions 125 is repeated for the remaining screen regions 125.

Figure 11:
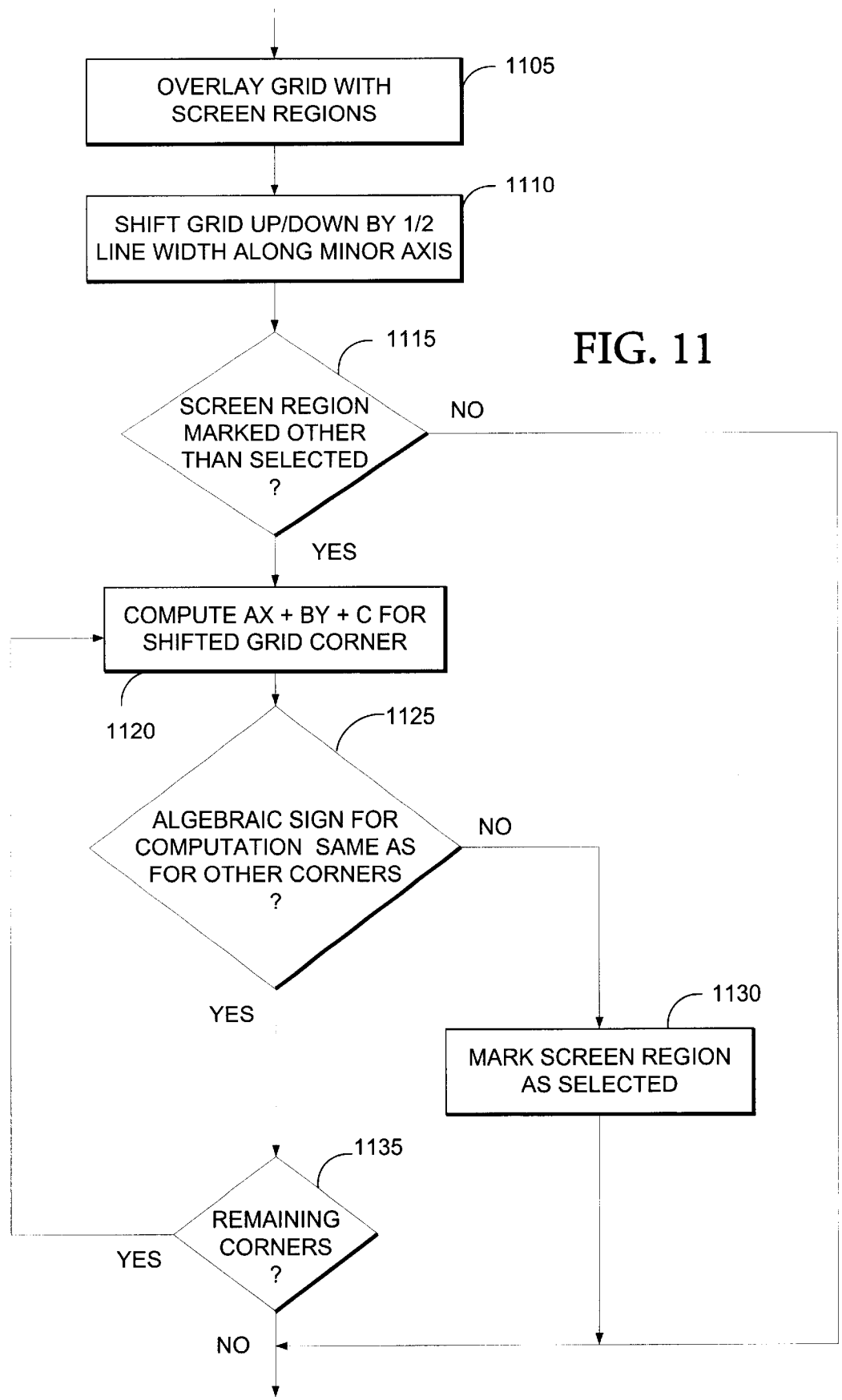
FIG. 11 is an illustrative flow chart of a method for selecting auxiliary screen regions to activate in rendering the straight line segment having widths greater than one pixel as described in various representative embodiments consistent with the teachings of the invention.

FIG. 11 is an illustrative flow chart of a method for selecting auxiliary screen regions 125 to activate in rendering the straight line segment 205 having widths greater than one pixel as described in various representative embodiments consistent with the teachings of the invention.

In block 1105, the screen regions 125 are overlaid by the rectangular grid 130. Block 1105 then transfers control to block 1110.

In block 1110, the rectangular grid 130 is shifted by an amount equal to one-half line width 932 of the straight line segment 205 parallel to the minor axis 822. In a representative embodiment, the method steps of FIG. 11 are performed with a downward shift in the rectangular gird 130 followed by a repeat of the method steps of FIG. 11 with an upward shift in the rectangular grid 130. Block 1110, then transfers control to block 1115.

In block 1115, when the screen region 125 is marked other than selected block 1115 transfers control to block 1120. Otherwise block 1115 terminates the process.

In block 1120, the expression A*x+B*y=C is computed for one of the shifted grid corners SG1 . . . SG4 associated with the screen region 125. Block 1120, then transfers control to block 1125.

In block 1125, when the algebraic sign of the result of the computation of the expression A*x+B*y+C obtained in block 1120 is the same as that computed for other shifted grid corners SG1 . . . SG4, block 1125 transfers control to block 1135. Otherwise, block 1125 transfers control to block 1130.

In block 1130, the screen region 125 is marked as selected. Block 1130 then terminates the process.

In block 1135, when there are remaining corners of the overlapping screen region 125 for which in block 1120 the expression A*x+B*y+C have not been computed, block 1135 transfers control to block 1120. Otherwise, block 1135 terminates the process.

Figure 12:
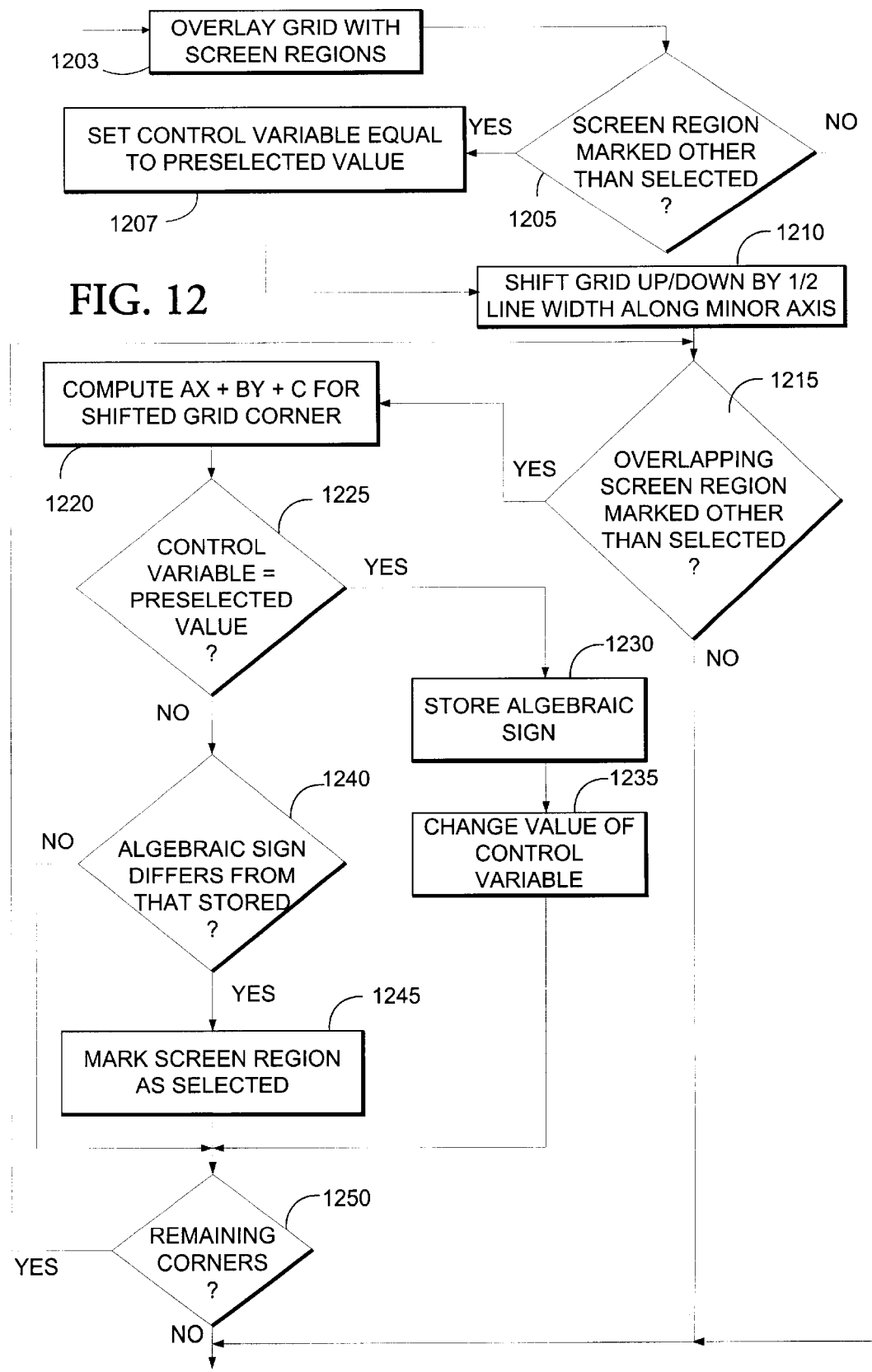
FIG. 12 is an illustrative flow chart of another method for selecting auxiliary screen regions to activate in rendering the straight line segment having widths greater than one pixel as described in various representative embodiments consistent with the teachings of the invention.

FIG. 12 is an illustrative flow chart of another method for selecting auxiliary screen regions 125 to activate in rendering the straight line segment 205 having widths greater than one pixel as described in various representative embodiments consistent with the teachings of the invention.

In block 1203, the screen regions 125 are overlaid by the rectangular grid 130. Block 1203 then transfers control to block 1205.

In block 1205, when the screen region 125 is marked other than selected block 1205 transfers control to block 1207. Otherwise block 1205 terminates the process.

In block 1207, a control variable is set equal to a preselected value, which could be for example the number "0". Block 1207 then transfers control to block 1210.

In block 1210, the rectangular grid 130 is shifted by an amount equal to one-half line width 932 of the straight line segment 205 parallel to the minor axis 822. In a representative embodiment, the method steps of FIG. 12 are performed with a downward shift in the rectangular gird 130 followed by a repeat of the method steps of FIG. 12 with an upward shift in the rectangular grid 130. Block 1210, then transfers control to block 1215.

In block 1215, when the screen region 125 is marked as other than selected, block 1210 transfers control to block 1220. Otherwise, block 1215 terminates the process.

In block 1220, the expression A*x+B*y=C is computed for one of the shifted grid corners SG1 . . . SG4 associated with the screen region 125. Block 1220, then transfers control to block 1225.

In block 1225, when the control variable is equal to the preselected value, block 1225 transfers control to block 1230. Otherwise, block 1225 transfers control to block 1240.

In block 1230, the algebraic sign of the result of the computation of the expression A*x+B*y+C obtained in block 1220 is stored. Block 1230 then transfers control to block 1235.

In block 1235, the value of the control variable is changed from its preselected value to something else, which could be for example the number "1". Block 1235 then transfers control to block 1250.

In block 1240, when the algebraic sign of the result of the computation of the expression A*x+B*y+C obtained in block 1220 differs from that stored in block 1230, block 1240 transfers control to block 1245. Otherwise, block 1240 transfers control to block 1250.

In block 1245, the screen region 125 is marked as selected. Block 1245 then transfers control to block 1250.

In block 1250, when there are remaining corners of the overlapping screen region 125 for which in block 1220 the expression A*x+B*y+C have not been computed, block 1250 transfers control to block 1215. Otherwise, block 1250 terminates the process.

It should be noted that a given rasterizer 120 may be responsible for more than one screen region 125 and may be either statically or dynamically assigned. A single rasterizer 120 may, in fact, be responsible for the full screen space 115. Advantages in performance may, however, be obtained for systems utilizing multiple rasterizers 120 and associated parallel processing.

As is the case, in many computer graphics products, the components necessary to display the items discussed herein may be implemented as a combination of hardware and software components. Moreover, the functionality require for using the invention may be embodied in computer-readable media (such as 3.5 inch diskettes, CD ROMs, hard drives, etc.) to be used in programming an information-processing apparatus (e.g., a personal computer comprising the elements shown in FIG. 1 to perform in accordance with the invention.

The display screen 110 may be monochrome or color, and a pointing device (not shown) such as pen, mouse, track point or a touch screen that is suitable for cursor manipulation may be used.

The computer 100 can be capable of running any commercially available operating system such as DOS, Windows 3.1, Windows CD, Windows 95/98/2000, UNIX, or other suitable operating system. The methods disclosed can be advantageously implemented in electronic circuitry where in parallel processing can be efficiently utilized. However, they can also be implemented as an application program for the computer system 100. Such an application program can be written using a variety of programming languages including Visual Basic, C/C++, assembler or any other commercially-available programming tools.

Novel techniques are disclosed herein for a computer graphics display system (1) for selecting regions of a screen to activate in rendering a straight line segment, (2) for selecting pixels to activate in rendering the straight line segment, and (3) for selecting pixels to activate in rendering the auxiliary area of the straight line segment required in cases wherein the straight line segment has a width. In a region-base rasterizer, it is important to quickly identify the regions that must be further processed in the rendering of straight lines so as not to waste hardware or software resources and to allow potential parallelisms to occur. By selecting regions to activate or consider, techniques disclosed herein limit the area of the screen that must be considered in drawing the straight line segment thereby providing for more computationally-efficient techniques.

In representative embodiments, the screen regions to be activated in displaying the straight line segment on the screen of the monitor are identified. Only those screen regions through which the straight line segment passes will need to be activated. All other screen regions can be ignored in the display of that straight line segment. The general equation of a straight line is A*x+B*y+C=0, which for the example of the straight line segment results in A=(Y2−Y1), B=(X1−X2), and C=−(A*X1+B*Y1) where A, B, and C are constants and the straight line segment passes through points {X1 ,Y1 } and {X2, Y2}. If the algebraic sign of the expression A*x+B*y+C when evaluated at one of the screen region corners differs from any of the other corners of the screen region, that screen region is marked to activate.

In another representative embodiment, the pixels are identified which will be illuminated in each of the activated screen regions in displaying the straight line segment on the screen of the monitor. Only those pixels through which the straight line segment passes may need to be illuminated. All others can be ignored in the display of that straight line segment. If the algebraic sign of the expression A*x+B*y+C when evaluated at one of the pixel corners differs from any of the other corners of the screen region, that pixel is marked to illuminate.

In still another representative embodiment, the screen regions are identified that will be activated in displaying the straight line segment on the screen of the monitor for cases in which the line has a width. Some pixels may be illuminated within adjoining screen regions due to the width of the line. However, only those screen regions through which the straight line segment including the width of the line passes will need to be activated. All others can be ignored in the display of that straight line segment. The screen regions are overlaid by a rectangular grid which is then shifted in a preselected direction along one of the axes. After which, if the algebraic sign of the expression A*x+B*y+C when evaluated at one of the shifted rectangular grid corners differs from any of the other corners of the shifted rectangular grid, the corresponding screen region is marked to activate. The screen regions are then shifted in the opposite direction along the previously selected axis and the above process repeated.

Primary advantages of the embodiments as described herein over prior solutions are the abilities to (1) remove screen regions from consideration in rendering straight line segments on the monitors of computer graphics systems, (2) remove pixels in such screen regions from consideration in rendering straight line segments on the monitors of computer graphics systems, and (3) identify auxiliary screen regions that need to be considered for activation in the rendering of straight line segments, wherein the straight line segment has a width. Such techniques conserve system resources in graphics systems which is a great advantage as these systems are computationally intensive.

What is claimed is:

1. A method for selecting a screen region on a screen of a monitor of a computer graphics display system to activate in rendering a straight line segment, the method comprising the steps of:

aligning a rectangular grid to screen region boundaries, wherein the screen comprises a screen space divided into at least one screen region:

locating a first and second endpoints of the straight line segment on the screen space, wherein a locus of the straight line segment is specified by equation A*x+B*y+C=0, wherein A, B, and C are respectively a first, second, and third constants, wherein x and y are respectively Cartesian coordinate system x-axis and y-axis values;

defining a rectangular bounding box in the screen space having vertices at the first and second endpoints; identifying each screen region that at least partially overlaps the bounding box; and selecting each identified screen region through which the straight line segment passes to activate for rendering the straight line segment on the screen, wherein the step of selecting each overlapping screen region through which the straight line segment passes further comprises the steps of:
- successively selecting once each corner of the overlapping screen region until the overlapping screen region is marked as selected:
  - evaluating expression A*x+B*y+C at the selected corner,
  - storing in a memory the algebraic sign of the evaluated expression for the selected corner, and
  - if the algebraic sign of the evaluated expression for the selected corner differs from any of the stored algebraic signs, marking the screen region as selected.

2. A program storage medium readable by a server computer, tangibly embodying a software program of instructions executable by the server to perform method steps for selecting a screen region on a screen of a monitor of a computer graphics display system to activate in rendering a straight line segment, the method steps comprising:

aligning a rectangular grid to screen region boundaries, wherein the screen comprises a screen space divided into at least one screen region;

locating a first and second endpoints of the straight line segment on the screen space, providing a locus of the straight line segment is specified by equation A*x+B*y+C=0, wherein A, B, and C are respectively a first, second, and third constants, wherein x and y are respectively Cartesian coordinate system x-axis and y-axis values;

defining a rectangular bounding box in the screen space having vertices at the first and second endpoints;

identifying each screen region that at least partially overlaps the bounding box; and selecting each identified screen region through which the straight line segment passes to activate for rendering the straight line segment on the screen, wherein the step of selecting each overlapping screen region through which the straight line segment passes further comprises the method steps of:
- successively selecting once each corner of the overlapping screen region until the overlapping screen region is marked as selected:
  - evaluating expression A*x+B*y+C at the selected corner,
  - storing in a memory the algebraic sign of the evaluated expression for the selected corner, and
  - if the algebraic sign of the evaluated expression for the selected corner differs from any of the stored algebraic signs, marking the screen region as selected.

* * * * *